United States Patent
Mogna et al.

(10) Patent No.: US 12,472,216 B2
(45) Date of Patent: Nov. 18, 2025

(54) COMPOSITIONS COMPRISING BACTERIAL STRAINS AND USE THEREOF FOR THE TREATMENT OF OCULAR DISEASES AND LESIONS

(71) Applicant: PROBIOTICAL S.P.A., Novara (IT)

(72) Inventors: Vera Mogna, Novara (IT); Marco Pane, Novara (IT); Angela Amoruso, Novara (IT); Ciro Costagliola, Novara (IT)

(73) Assignee: PROBIOTICAL S.P.A., Novara (IT)

( * ) Notice: Subject to any disclaimer, the term of this patent is extended or adjusted under 35 U.S.C. 154(b) by 497 days.

(21) Appl. No.: 17/922,779

(22) PCT Filed: May 11, 2021

(86) PCT No.: PCT/IB2021/054003
§ 371 (c)(1),
(2) Date: Nov. 1, 2022

(87) PCT Pub. No.: WO2021/229433
PCT Pub. Date: Nov. 18, 2021

(65) Prior Publication Data
US 2023/0158090 A1    May 25, 2023

(30) Foreign Application Priority Data
May 12, 2020   (IT) .................. 102020000010666

(51) Int. Cl.
*A61K 35/747* (2015.01)
*A61K 9/00* (2006.01)
*A61K 45/06* (2006.01)
*A61P 27/02* (2006.01)

(52) U.S. Cl.
CPC .......... *A61K 35/747* (2013.01); *A61K 9/0048* (2013.01); *A61K 9/0053* (2013.01); *A61K 45/06* (2013.01); *A61P 27/02* (2018.01)

(58) Field of Classification Search
CPC .................................................... A61K 35/747
See application file for complete search history.

(56) References Cited

U.S. PATENT DOCUMENTS

2006/0157064 A1*  7/2006  Davison ............... A61F 9/029
                                              128/858

OTHER PUBLICATIONS

Zhang et al (Current Microbiology vol. 77, pp. 343-352) (Year: 2019).*
Xie et al (Applied and Environmental Microbiology vol. 87 (3), pp. 1-15) (Year: 2021).*
Bonavina et al., "Lactobacillus plantarum LP01, Lactobacillus lactis subspecies cremoris LLC02, and Lactobacillus delbrueckii LDD01 in patients undergoing bowel preparation", Acta Biomed, 2019, vol. 90, Supplement 7: 13-17.
Chisari et al., "Aging Eye Microbiota in Dry Eye Syndrome in Patients Treated with Enterococcus faecium and *Saccharomyces boulardii*", Current Cinical Pharmacology, 2017, 12: 99-105.
Del Piano et al., "Assessment of the Capability of a Gelling Complex Made of Tara Gum and the Exopolysaccharides Produced by the Microorganism *Streptococcus thermophilus* ST10 to Prospectively Restore the Gut Physiological Barrier A Pilot Study", J. Clin Gastroenterol, 2014, 48: S56-S61.

* cited by examiner

*Primary Examiner* — Albert M Navarro
(74) *Attorney, Agent, or Firm* — James S. Keddie; Bozicevic, Field & Francis LLP

(57) ABSTRACT

The present invention relates to mixtures, or compositions comprising said mixtures, comprising at least one bacterial strain, preferably at least one probiotic bacterial strain or a derivative thereof, as well as to the use of said mixtures or compositions in methods for the preventive and/or curative treatment of an inflammatory ocular and/or periocular lesion, preferably in methods for the treatment of ocular diseases such as dry eyes, eyelid allergy, conjunctivitis, blepharitis, meibonite, dacryoliths, stye, inflammatory lesions of ocular adnexa and associated symptoms.

14 Claims, No Drawings

COMPOSITIONS COMPRISING BACTERIAL STRAINS AND USE THEREOF FOR THE TREATMENT OF OCULAR DISEASES AND LESIONS

CROSS-REFERENCE TO RELATED APPLICATIONS

This application is a § 371 national phase of International Application No. PCT/IB2021/054003, filed on May 11, 2021, which claims the benefit of Italian Application No. 102020000010666, filed on May 12, 2020, all of which applications are incorporated by reference herein.

The present invention relates to mixtures, or compositions comprising said mixtures, comprising at least one bacterial strain, preferably at least one probiotic bacterial strain or a derivative thereof, as well as to the use of said mixtures or compositions in methods for the preventive and/or curative treatment of an inflammatory ocular and/or periocular lesion, preferably in methods for the treatment of ocular diseases such as dry eyes, eyelid allergy, conjunctivitis, blepharitis, meibonite, dacryoliths, stye, inflammatory lesions of ocular adnexa and associated symptoms.

To date, treatment options for ocular diseases and inflammatory lesions of ocular adnexa range from non-invasive conservative methods (eyelid hygiene, hot packs, topical drugs such as combinations of antibiotics, corticosteroids or antibiotic corticosteroids) to invasive methods (intralesional steroid injection as well as surgical incision and curettage). When initial conservative methods fail, invasive methods are performed. Though conservative methods offer the lowest rate of complication, unfortunately they are often ineffective in the total resolution of inflammatory diseases and lesions of ocular adnexa or are followed by a recurrence thereof. On the contrary, invasive methods are the most effective, although they have a higher chance of complications (side effects). As a matter of fact, intralesional injection can be complicated by ocular penetration of steroids, local skin depigmentation and atrophy of subcutaneous fat, retinal and choroidal vascular occlusion in rare cases, anterior segment ischemia, IOP elevation, visual loss, while surgical incision and curettage entail risks such as pain, bleeding and scars.

When the aforementioned ocular diseases and inflammatory lesions of ocular adnexa occur in paediatric subjects, and non-invasive medical therapy does not work, surgery is undesirable to parents, and in children under three years of age a potential risk may arise related to full body anaesthesia.

Therefore, the need is felt to be able to have a treatment alternative to the conservative or invasive methods described above, capable of overcoming the limits and drawbacks still existing.

The technical problem addressed and solved by the present invention lies in providing an effective and non-invasive solution for the treatment of an inflammatory ocular and/or periocular lesion, in particular of ocular diseases such as dry eyes, eyelid allergy, conjunctivitis, blepharitis, meibonite, dacryoliths, stye, inflammatory lesions of ocular adnexa and of disorders or symptoms associated or related thereto, in subjects in need, particularly in both adult and paediatric human subjects.

Following an intense research and development activity the Applicant addresses and solves the aforementioned technical problem by providing innovative mixtures and/or compositions (in short, mixtures or compositions of the invention), preferably for oral use, comprising at least one or more selected bacterial strains, preferably probiotic bacterial strains, selected from the group comprising or, alternatively, consisting of: a strain belonging to the species *Streptococcus thermophilus*, preferably *Streptococcus thermophilus* ST10 (DSM 25246), a strain belonging to the species *Lactococcus lactis*, preferably *Lactococcus lactis* LLC02 (DSM 29536), and a strain belonging to the species *Lactobacillus delbruecki* subsp. *bulgaricus*, preferably *Lactobacillus delbruecki* subsp, *bulgaricus* LDB 01 (DSM 16606).

Said compositions of the invention have shown therapeutic properties for the treatment of ocular diseases such as dry eyes, eyelid allergy, conjunctivitis, blepharitis, meibonite, dacryoliths, stye, inflammatory lesions of the ocular adnexa also thanks to the combination and/or synergistic effect of said selected bacterial strains.

This technical problem, as solved by the present invention, is not suggested by the publicly available literature in any manner whatsoever. As a matter of fact, in no case has it been even suggested that the use of bacterial strains, as studied in the present context, could be effectively used in the treatment of inflammatory lesions of ocular adnexa.

For example, Del Piano et. al., J. of Clin gastroenterol, vol. 48, no. S1, 1 Jan. 2014, describes the ability of the bacterial strain *Streptococcus thermophilus* ST10, combined with Tara gum, to restore the intestinal barrier in healthy subjects. However, this document does not describe the use of this bacterial strain for the treatment of ocular inflammations, and it much less describes the use thereof combined with other probiotic bacterial strains.

Bonavina et al., Acta biomedica, Atenei Parmensis, 10 Jul. 2019, pages 13-17 suggest the use of bacterial strains such as *Lactobacillus plantarum* LP01, *Lactobacillus lactis* subspecies *cremoris* LLC02, and *Lactobacillus delbrueckii* LDD01 in patients undergoing intestinal preparation (BP) for colonoscopy. However, this document does not describe in any part thereof the treatment of ocular inflammation, much less does it suggest the use of strains as described in the present context as resolution of the same.

Lastly, Chisari et al., Current clinical Pharmacology, 2017, 12, 99-105 describes a mixture comprising *Saccharomyces boulardii* MUCL 53837 and *Enterococcus faecium* LMG S-28935 for use in the treatment of the dry eye syndrome (DES). However, this document does not suggest the use of strains as described in the present context as an effective solution to the problem of inflammatory lesions of ocular adnexa.

Furthermore, the compositions or mixtures of the present invention do not have significant side effects and they can be administered to a wide category of subjects in need, including adults, paediatric subjects (0-3 years or 3-12 years), the elderly, pregnant or breastfeeding women.

Lastly, the compositions or mixtures of the present invention are easy to prepare and cost-effective.

There seems to be a possible link between gut dysbiosis and ophthalmic diseases, such as uveitis, viral keratoconjunctivitis, keratitis, glaucoma, age-related macular degeneration and diabetic retinopathy. However, there are no known efficacy data relating to the use of bacterial strains, preferably probiotic strains, in the treatment of ocular diseases such as dry eyes, eyelid allergy, conjunctivitis, blepharitis, meibonite, dacryoliths, stye, inflammatory lesions of ocular adnexa neither in children nor adults.

These and other objects, which will be clear from the detailed description that follows, are attained by the compositions and the mixtures of the present invention due to the technical characteristics claimed in the attached claims.

DETAILED DESCRIPTION OF THE INVENTION

Forming an object of the present invention is a mixture M (in short, mixture or mixture M of the invention) comprising or, alternatively, consisting of at least one or more probiotic bacterial strains or derivatives thereof selected from the group (I) consisting of:

(a) a bacterial strain belonging to the species *Streptococcus thermophilus*, preferably the strain *Streptococcus thermophilus* ST10 deposited at Deutsche Sammlung von Mikroorganismen und Zellkulturen GmbH (DSMZ) under accession number DSM 25246 (deposited on 19. Sep. 2011 by Probiotical S.p.A.) (in short *S. thermophilus* ST10 DSM 25246);

(b) a strain belonging to the species *Lactococcus lactis*, preferably the strain *Lactococcus lactis* LLC02 deposited at Deutsche Sammlung von Mikroorganismen und Zellkulturen GmbH (DSMZ) under accession number DSM 29536 (deposited on 22 Oct. 2014 by Probiotical S.p.A.) (in short, *L. lactis* LLC02 DSM 29536);

(c) a strain belonging to the species *Lactobacillus delbruecki* subsp. *bulgaricus*, preferably the strain *Lactobacillus delbruecki* subsp. *bulgaricus* LDB 01 deposited at Deutsche Sammlung von Mikroorganismen und Zellkulturen GmbH (DSMZ) under accession number DSM 16606 (deposited on 20 Jul. 2004 by Probiotical S.p.A.) (in short *L delbruecki* subsp. *bulgaricus* LDB 01 DSM 16606); and (d) a mixture of (a), (b) and/or (c), for example (a) and (b), or (a) and (c) or (b) and (c), or (a) and (b) and (c), and optionally, a carrier substance such as for example, a maltodextrin and/or inulin.

In an embodiment, the mixture M of the present invention comprises or, alternatively, consists of one, two or three bacterial strains, preferably probiotic bacterial strains, or derivatives thereof, selected from:

(a) *S, thermophilus* ST10 DSM 25246; and/or
(b) *L. lactis* LLC02 DSM 29536; and/or
(c) *L. delbruecki* subsp. *bulgaricus* LDB 01 DSM 16606.

Forming an object of the present invention is a composition (in short, composition of the invention) comprising:

(i) said mixture M of the invention comprising or, alternatively, consisting of at least one or more probiotic bacterial strains (two or three) or derivatives thereof selected from the group consisting of:

(a) a bacterial strain belonging to the species *Streptococcus thermophilus*, preferably the strain *S. thermophilus* ST10 DSM 25246;

(b) a strain belonging to the species *Lactococcus lactis*, preferably the strain *L. lactis* LLC02 DSM 29536;

(c) a strain belonging to the species *Lactobacillus delbruecki* subsp. *bulgaricus*, preferably the strain *L. delbruecki* subsp. *bulgaricus* LDB 01 DSM 16606; and (d) a mixture of (a), (b) and/or (c); and (ii) at least one acceptable pharmaceutical or food grade additive and/or excipient.

In an embodiment, the composition of the invention comprises:

(i) a mixture M according to the present invention comprising or, alternatively, consisting of at least one or two or three bacterial strains, preferably probiotic bacterial strains, or derivatives thereof, selected from:

(a) *S. thermophilus* ST10 DSM 25246; and/or
(b) *L. lactis* LLC02 DSM 29536; and/or
(c) *L. delbruecki* subsp. *bulgaricus* LDB 01 DSM 16606; and (ii) at least one pharmaceutical or food grade additive and/or excipient, for example maltodextrin.

Besides at least one or more (two or three) bacterial strains selected from group (I) (preferably mixture of *S. thermophilus* ST10 DSM 25246, *L. lactis* LLC02 DSM 29536 and *L. delbruecki* subsp. *bulgaricus* LDB 01 DSM 16606), and, optionally, at least one further active ingredient selected from group (III) described hereinafter, the mixture M of the composition of the invention may further comprise at least one prebiotic, preferably selected from group (II) consisting of: inulin, fructooligosaccharide (FOS), galactooligosaccharide (GOS), xylooligosaccharide (XOS), guar gum, and a mixture thereof.

Besides at least one or more bacterial strains selected from group (I) (preferably mixture of *S. thermophilus* ST10 DSM 25246, *L. lactis* LLC02 DSM 29536 and *L. delbruecki* subsp. *bulgaricus* LDB 01 DSM 16606), and, optionally, a prebiotic selected from group (II) and/or a further active ingredient selected from group (III) described hereinafter, the mixture M contained in the composition of the invention may further comprise at least one or more further probiotic bacterial strains or derivatives thereof, preferably one or more further strains belonging to the genus *Lactobacillus* or *Bifidobacterium* or *Staphylococcus*.

Besides at least one or more bacterial strain selected from the group (I) (preferably mixture of *S. thermophilus* ST10 DSM 25246, *L. lactis* LLC02 DSM 29536 and *L. delbruecki* subsp. *bulgaricus* LDB 01 DSM 16606), and, optionally, a prebiotic selected from group (II) and/or a further probiotic bacterial strain, the mixture M contained in the composition of the invention may further comprise at least one further active ingredient selected from group (III) comprising or, alternatively, consisting of:

vitamins of group A, B, C, D and/or E; and/or
plant substances (botanicals) or extracts thereof; and/or
minerals or salts thereof; and/or
a mixture thereof.

The composition of the invention, comprising said mixture M according to any one of the embodiments of the present invention, further comprises said at least one acceptable pharmaceutical or food grade additive and/or excipient, that is a substance devoid of therapeutic activity suitable for pharmaceutical or food use. In the context of the present invention the additives and/or excipients acceptable for pharmaceutical or food use comprise all ancillary substances known to the person skilled in the art for the preparation of compositions in solid, semi-solid or liquid form, such as for example diluents, solvents (including water, glycerine, ethyl alcohol), solubilisers, acidifiers, thickeners, sweeteners, flavour-enhancement agents, colouring agents, lubricants, surfactants, preservatives, stabilisers, pH stabilising buffers and mixtures thereof.

All bacterial strains described in the present invention were deposited according to the provisions pursuant to the Budapest treaty. The Depositing party of the bacterial strains described and/or claimed in the present patent application and the proprietor thereof express, from the outset, their consent to make available all the aforementioned strains for the whole duration of the patent.

Advantageously, said bacterial strains comprised in the composition of the invention (strains (a)-(g)) are viable bacterial strains (probiotics). Alternatively, said bacterial strains of the invention may be a derivative of the viable strain, as defined in the present invention.

"Probiotics" (e.g. bacterial strains) are live and viable microorganisms which, when administered in adequate amount, confer benefits to the health of the host (FAO/WHO definition, 2002); the term "probiotic" refers to microorganisms present in or added to food or administered for example in the form of capsules, tablets or in another pharmaceutical form.

In the context of the present invention, the expression "derivative" of the bacterial strain (or "derivative" of the viable bacterial strain) is used to indicate the tyndallized or sonicated bacterial strain, the lysates or homogenates of the bacterial strain, the extracts or the parietal fraction of the bacterial strain (referred to as paraprobiotics), the metabolites or metabolic bioproducts or exopolysaccharides (EPS) generated by the bacterial strain (referred to as postbiotics) and/or any other product derived from bacterial strain known to the person skilled in the art. Said derivatives are obtained according to methods known to the person skilled in the art. Preferably the expression "derivative" of the bacterial strain is used to indicate the tyndallized and/or homogenised strain.

The composition of the invention, according to any one of the described embodiments, may be prepared in the form of a pharmaceutical composition (or Live Biotherapeutic Products), a medical device composition (Reg. EU 2017/745), a dietary supplement, a food (or novel food or food for special medical purposes), a composition for a dietary supplement or food, or, alternatively, a composition for cosmetic use.

The compositions or mixtures M of the present invention, according to any one of the described embodiments, may be formulated for oral use, for nasal inhalation (e.g. spray or drops), for oral inhalation (e.g. spray, dry inhalation powder), or for topical use (e.g. cutaneous or ophthalmic), preferably topical ophthalmic. Preferably, the compositions of the present invention are for oral use.

In the context of the present invention the expression for oral use is used to indicate for example both for oral (or gastroenteric) administration and sublingual (or buccal) administration.

The composition of the present invention may be formulated for oral use in solid form, for example, selected from: tablets, chewable tablets, mouth-dissolving tablets, capsules, granules, flakes, powder, soluble powder or granules (for example packaged in sachets), mouth-dissolving powder and granules (for example packaged in mouth-dissolving sticks); or, alternatively, in liquid form, for example, selected from: solutions, suspensions, emulsions, syrups, for example packaged in drinkable phials, liquid which can be dispensed in the form of spray; or, alternatively, in semi-liquid form, for example, selected from: soft-gel, gel or cream; preferably the composition of the invention is for oral use in solid form, more preferably in the form of soluble or water-soluble powder (for example in water or water-based liquid such as milk).

The composition of the present invention may be formulated for topical use, preferably ophthalmic topical use (i.e. ocular or periocular region) in the form of a liquid, for example ophthalmic solution; or, alternatively, in semi-liquid form, for example ophthalmic gel or cream.

Forming an object of the present invention are mixtures M or compositions of the invention, according to any one of the described embodiments, preferably comprising *S. thermophilus* ST10 DSM 25246, *L. lactis* LLC02 DSM 29536 and *L. delbruecki* subsp. *bulgaricus* LDB 01 DSM 16606, for use as medicament.

The compositions or mixtures M of the present invention, according to any one of the described embodiments, preferably comprising at least one bacterial strain *S. thermophilus* ST10 DSM 25246, *L. lactis* LLC02 DSM 29536 and *L. delbruecki* subsp. *bulgaricus* LDB 01 DSM 16606, are for use in a method for the preventive and/or curative treatment of an inflammatory lesion of the ocular and/or periocular region and of symptoms or disorders associated therewith, preferably wherein said inflammatory lesion is selected from Stye, Meibomite, Blepharitis, Dacryoliths, dry eyes, eyelid allergy, conjunctivitis, inflammatory lesions of ocular adnexa.

Forming an object of the present invention is a bacterial strain belonging to the species *Streptococcus thermophilus*, identified as *Streptococcus thermophilus* ST10 and deposited at Deutsche Sammlung von Mikroorganismen und Zellkulturen GmbH (DSMZ) under accession number DSM 25246, for use in a method for the preventive and/or curative treatment of an inflammatory lesion of the ocular and/or periocular region and of symptoms or disorders associated therewith, preferably wherein said inflammatory lesion is selected from Stye, Meibomite, Blepharitis, Dacryoliths, dry eyes, eyelid allergy, conjunctivitis, inflammatory lesions of ocular adnexa.

Forming an object of the present invention is a bacterial strain belonging to the species *Lactococcus lactis*, identified as *Lactococcus lactis* LLC02 and deposited at Deutsche Sammlung von Mikroorganismen und Zellkulturen GmbH (DSMZ) under accession number DSM 29536, for use in a method for the preventive and/or curative treatment of an inflammatory lesion of the ocular and/or periocular region and of symptoms or disorders associated therewith, preferably wherein said inflammatory lesion is selected from Stye, Meibomite, Blepharitis, Dacryoliths, dry eyes, eyelid allergy, conjunctivitis, inflammatory lesions of ocular adnexa.

Forming an object of the present invention is a strain belonging to the species *Lactobacillus delbruecki* subsp. *bulgaricus*, identified as *Lactobacillus delbruecki* subsp. *bulgaricus* LDB 01 and deposited at Deutsche Sammlung von Mikroorganismen und Zellkulturen GmbH (DSMZ) under accession number DSM 16606, for use in a method for preventive and/or curative treatment of an inflammatory lesion of the ocular and/or periocular region and of symptoms or disorders associated therewith, preferably wherein said inflammatory lesion is selected from Stye, Meibomite, Blepharitis, Dacryoliths, dry eyes, eyelid allergy, conjunctivitis, inflammatory lesions of ocular adnexa.

Advantageously, the individual bacterial strains preferably *S. thermophilus* ST10 DSM 25246, *L. lactis* LLC02 DSM 29536 and *L. delbruecki* subsp. *bulgaricus* LDB 01 DSM 16606, the mixtures M containing said bacterial strains and the compositions containing said mixtures M of the present invention, according to any one of the described embodiments, are for use in a method for preventive and/or curative treatment of ocular diseases such as dry eyes, eyelid allergy, conjunctivitis, blepharitis, meibonite, dacryoliths, stye, inflammatory lesions of ocular adnexa or deriving from the aforementioned diseases and/or lesions, and/or in the decrease in or suppression of the onset of relapses thereof, in a subject in need by administering, preferably through the oral route, a therapeutically effective amount of said compositions or mixtures M to said subject.

The compositions or mixtures M of the present invention, according to any one of the described embodiments, may be for use as adjuvants of further therapeutic approaches (e.g. non-invasive methods, such as eyelid hygiene, hot packs, topical drugs such as combinations of antibiotics, corticosteroids or antibiotic corticosteroids) in the preventive and/or curative treatment of ocular diseases such as dry eyes, eyelid allergy, conjunctivitis, blepharitis, meibonite, dacryoliths, stye, inflammatory lesions of ocular adnexa and symptoms or disorders associated or related therewith.

In an embodiment, the mixture for use or the composition for use in the treatment of an inflammatory lesion of the ocular and/or periocular region, preferably ocular diseases such as dry eyes, eyelid allergy, conjunctivitis, blepharitis, meibonite, dacryoliths, stye, inflammatory lesions of ocular adnexa and symptoms or disorders associated therewith, according to any one of the claims of the described embodiments, may be administered combined with an ophthalmic antibiotic and/or an ophthalmic steroidal anti-inflammatory; preferably tobramycin and/or dexamethasone and/or similar drugs known on the market.

The microbiome of the ocular surface confers potent immune-regulatory functions and it plays a key role in the physiological maintenance of healthy eyes and/or pathogenesis of ocular diseases. As a matter of fact, a change or impoverishment of the physiological ocular microbiome can lead to ophthalmic diseases.

Furthermore, it is realistic to assume a role for miRNAs in various ocular diseases. In a prospective comparative pilot study conducted (experimental part), the Applicant shows that the M mixture or composition of the invention increases the efficacy of conventional non-invasive therapies in inducing a full resolution of inflammatory lesions of ocular adnexa, preferably in medium-small lesions (for example an average diameter of about ≤2 mm in adults and ≤2 mm$^2$ in paediatric subjects). The significant difference in the time required for the full resolution of inflammatory lesions of ocular adnexa between the subjects administered or not administered with the composition of the invention, confirms the presence of a gut-eye axis in favour of those administered. Short-chain fatty acids, mainly butyric acid, but also propionic and acetic acid, produced by the fermentation of dietary fibres by suitable gut bacterial strains (e.g. those comprised in the mixtures M or compositions of the invention), have a great immunomodulatory activity. Furthermore, the exposure of the host to suitable gut bacterial strains (e.g. those comprised in the mixtures M or compositions of the invention) can serve as activation signal for B-cells at sites other than the gut, such as lymphoid tissues associated with the eyes.

The strains belonging to the species *Streptococcus thermophilus, Lactococcus lactis* and *Lactobacillus delbrueckii* subsp. *bulgaricus* comprised in the mixture M of the invention are Gram-positive anaerobic bacteria capable of producing not only lactic acid, but also other microbial substances, such as hydrogen peroxide and bacteriocins (small peptides—synthesised by the ribosomes of some bacteria—which show a bacteriostatic or bactericidal activity on other microbial strains).

Advantageously, said at least one bacterial strain or each bacterial strain is present in the mixture M or composition of the invention, with respect to a daily dose of composition or mixture M of the invention, in a concentration comprised in the range from $10 \times 10^6$ CFU/AFU to $10 \times 10^{12}$ CFU/AFU, preferably from $10 \times 10^8$ CFU/AFU to $10 \times 10^{10}$ CFU/AFU, more preferably in a concentration of about $10 \times 10^8$ CFU/AFU or $10 \times 10^9$ CFU/AFU, (CFU Colony Forming Unit; AFU: Active Fluorescent Unit).

For example, a daily dose of a mixture or composition of the invention comprises: ≥$1 \times 10^9$ live bacteria of *Streptococcus thermophilus* ST10 (DSM 25246), ≥$1 \times 10^9$ live bacteria of *Lactococcus lactis* LLC02 (DSM 29536), ≥$1 \times 10^9$ live bacteria of *Lactobacillus delbruecki* subsp. *bulgaricus* LDB 01 (DSM 16606), and maltodextrin.

In order to evaluate the number of live bacteria in the compositions or mixtures M of the present invention, said compositions or mixtures M may be analysed through flow cytometry, to determine the AFU value and/or plate count method, to determine the CFU value.

The aforementioned daily doses can be administered to the subject in need in a single dose (one dose) or in repeated doses, for example two, three or four daily doses.

Lastly, the present invention describes a process for the preparation of the compositions or mixtures M of the invention, wherein said process comprises the step of mixing the components of said mixtures M or compositions according to methods known to the person skilled in the art.

Unless specified otherwise, the expression composition or mixture or other comprising a component at an amount "comprised in a range from x to y" is used to indicate that said component can be present in the composition or other at all the amounts present in said range, even though not specified, extremes of the range comprised.

Unless specified otherwise, the indication that a composition "comprises" one or more components or substances means that other components or substances can be present besides the one, or the ones, indicated specifically.

In the context of the present invention, the expression "treatment method" is used to indicate an intervention on a subject in need, comprising the administration of the bacterial strain or of a composition of the invention with the aim of eliminating, reducing/decreasing or preventing a disease or ailment and the symptoms or disorders thereof.

In the context of the present invention, the expression "subject/s" of the present invention is used to indicate mammals (animals and humans), preferably both adult and paediatric age human subjects from about 0 to about 3 years and/or from about 3 years to about 12 years (paediatric subjects).

The term "therapeutically effective amount" refers to the amount of active compound and/or bacterial strain that elicits the biological or medicinal response in a tissue, system, mammal, or human being that is sought and defined by an individual, researcher, veterinarian, physician, or other clinician or health worker.

In the context of the present invention, the term "medical device" is used in the meaning according to the Legislative Decree n° 46 dated 24 Feb. 1997, or in accordance with the new Medical device regulation (EU) 2017/745 (MDR).

In the context of the present invention, the term "novel food" is used in the meaning according to Regulation EC 258 dated 1997.

Embodiments FRns of the present invention are reported below:

FR1. A mixture M comprising or, alternatively, consisting of:
  a bacterial strain belonging to the species *Streptococcus thermophilus*, identified as *Streptococcus thermophilus* ST10 and deposited at Deutsche Sammlung von Mikroorganismen und Zellkulturen GmbH (DSMZ) under accession number DSM 25246;
  a strain belonging to the species *Lactococcus lactis*, identified as *Lactococcus lactis* LLC02 and deposited at Deutsche Sammlung von Mikroorganismen und Zellkulturen GmbH (DSMZ) under accession number DSM 29536;
  a strain belonging to the species *Lactobacillus delbruecki* subsp. *bulgaricus*, identified as *Lactobacil-*

*lus delbruecki* subsp. *bulgaricus* LDB 01 and deposited at Deutsche Sammlung von Mikroorganismen und Zellkulturen GmbH (DSMZ) under accession number DSM 16606.

FR2. The mixture according to FR1, wherein said bacterial strains are viable or are derivatives thereof, wherein said derivatives are selected from: tyndallized or sonicated bacterial strains, lysates or homogenates of bacterial strains, parietal extracts or fractions of bacterial strains.

FR3. A composition comprising
the mixture M according to FR1 or FR2, and
at least one food or pharmacological grade additive and/or excipient.

FR4. The mixture according to FR1 or FR2 or the composition according to FR3 for use as medicament.

FR5. The mixture according to FR1 or FR2 or the composition according to FR3 for use in a method for the preventive and/or curative treatment of an inflammatory lesion of the ocular and/or periocular region and/or of symptoms or disorders associated with or deriving from said inflammatory lesion, in a subject in need.

FR6. The mixture or the composition for use according to FR5, wherein said inflammatory lesion of the ocular and/or periocular region is selected from Stye, Meibomite, Blepharitis, Dacryoliths, dry eyes, eyelid allergy, conjunctivitis, inflammatory lesions of the ocular adnexa.

FR7. The mixture or the composition for use according to any one of FR4-FR6, wherein said mixture or composition is for use in a method for preventive and/or curative treatment of ocular diseases such as dry eyes, eyelid allergy, conjunctivitis, blepharitis, meibonite, dacryoliths, stye, inflammatory lesions of ocular adnexa and/or of symptoms or disorders associated therewith or deriving therefrom, and/or for use in a method for the preventive and/or curative treatment of a decrease in or suppression of the onset of relapses thereof, in a subject in need.

FR8. The mixture or the composition for use according to any one of FR4-FR7, wherein the mixture or composition is administered through the oral route or through the ophthalmic topical route; preferably through the oral route; more preferably through the oral route in solid or liquid form.

FR9. The mixture or the composition for use according to any one of FR4-FR8, wherein the mixture or composition is administered combined with an ophthalmic antibiotic and/or an ophthalmic steroidal anti-inflammatory; preferably tobramycin and/or dexamethasone.

FR10. The mixture or the composition for use according to any one of FR4-FR9, wherein said subjects are adult subjects or paediatric subjects.

EXPERIMENTAL PART (I) Adult Clinical Study

The purpose of the study is to define the possible beneficial impact of an oral composition of probiotic strains of the present invention (in short, composition under analysis) on patients suffering from ocular diseases such as dry eyes, eyelid allergy, conjunctivitis, blepharitis, meibonite, dacryoliths, stye, inflammatory lesions of ocular adnexa.

I.1. Composition Under Analysis

A single dose of the composition under analysis (i.e. composition according to the present invention) consisted of:
- $\geq 1 \times 10^9$ live cells of *Streptococcus thermophilus* ST10 (DSM 25246),
- $\geq 1 \times 10^9$ live cells of *Lactococcus lactis* LLC02 (DSM 29536),
- $\geq 1 \times 10^9$ live cells of *Lactobacillus delbruecki* subsp. *bulgaricus* LDB 01 (DSM 16606), and
- maltodextrin as carrier.

The composition under analysis was supplied by Probiotical S.p.A., Novara, Italy.

The study materials were analysed by Biolab Research S.r.l., Novara, Italy, by means of flow cytometry (ISO 19344:2015 IDF 232:2015, results $>3 \times 10^9$ AFU) and plate counting method (plate count method, Biolab Research Method 014-06, results $>3 \times 10^9$ CFU) to confirm the number of target cells. Shelf-life was monitored to ensure that the minimum number of cells is maintained. Furthermore, the composition sachets of the invention not used in the study and returned were tested to verify the viability of the microorganisms using the AFU/CFU methods. With very few exceptions, viability exceeded the minimum dose required throughout the study.

Patients were advised to store the study composition under study in a refrigerator at 2-8 degrees centigrade.

I.2. Patients and Method

The study was conducted at the "V. Tiberio" Department of Medicine and Health Sciences of the University of Molise, Campobasso (Italy), from February 2019 to February 2020.

All patients enrolled for the study had one or more mass lesions of the eyelid and they received a full ophthalmologic examination, including the size, position and duration of the inflammatory lesions of ocular adnexa prior to recruitment. The inclusion criteria were:
i) history of rapid onset of painful inflamed mass which had reached a stationary dimension for more than 2 months;
ii) the clinical appearance and location of the lesion.

The exclusion criteria were:
i) infection of the eyelids;
ii) duration of lesion<1 month;
iii) non-palpable lesion;
iv) suspicion of malignancy;
v) comorbidity (constitutional and seborrheic dermatitis, hormonal dysfunction, presence of irritable bowel diseases, infectious mainly related to *Staphylococcus aureus* and *Propionibacterium acnes*, infection from Demodex mite, vitamin A deficiency, arterial hypertension, diabetes, and pregnancy) and personal habits (smoking, eating disorders, etc.).

A prospective comparative pilot study was conducted in 20 patients (7 males and 13 females, age ranging from 39-54 years, mean age 48.3 years) randomly divided into two groups.

The first group, Group A: 10 patients (4 males and 6 females) received conservative treatment with eyelid hygiene, hot compression, and dexamethasone/tobramycin ointment (in short, medical treatment) for at least 20 days.

The second group, Group B: besides the aforementioned conservative treatment (medical treatment), 10 patients (3 males and 7 females) received the composition under analysis (point I.1.) once daily up to 3 months.

Lesions were classified according to their size (average diameter) in three groups: small (about 2 mm), medium (about 2-4 mm), or large (about >4 mm).

When conservative treatment (with and without composition under analysis) failed to resolve the lesion, invasive methods, and specifically intralesional steroid injection into medium-sized lesions and surgical incision and curettage for larger lesions, were used.

The composition under analysis was packaged as powders in sachet. Participants were asked to dissolve the powder in water or milk and drink it in the morning and/or evening.

This study adhered to the principles of the Declaration of Helsinki and obtained ethical approval from the Scientific Technical Committee of the "V. Tiberio" Department of Medicine and Health Sciences of the University of Molise, Campobasso, Italy, and written informed consent was obtained from all participants after a detailed description of the procedure used and the work.

I.3. Results

All participants completed the test. The mean age was matched in the two groups considered (Group A: mean age 47.9 years; Group B: mean age 48.6 years; p=not significant). Both groups had similar baseline characteristics in terms of size, position and duration of the lesion, with the exception of gender; as a matter of fact, greater prevalence was observed in female group (Table 1).

Medical treatment with or without the composition under analysis was only fully effective on small lesions (approximately <2 mm). However, in this subgroup, a significant difference in the time required for a full resolution was recorded between Group A (without the composition under analysis) and Group B (with the composition under analysis), being shorter in seconds (Group A: 37.6×11.8 days; Group B: 23.7×9.8 days; p<0.01, Mann Whitney U test) (Table 2).

Medium and large inflammatory lesions of ocular adnexa did not respond to medical treatment with or without the composition under analysis during the follow-up period (3 months). Invasive methods (i.e. intralesional steroid injection or surgical incision and curettage) were used in these patients.

The treatment (medical treatment with or without the composition under analysis) did not induce significant complications in both groups (Table 3). No cases of relapse of the lesion were observed both in groups A and B.

Table 1

| Characteristics | Group A (n = 10) | Group B (n = 10) | P value# |
|---|---|---|---|
| Mean age (years) | 47.9 ± 5.2 | 48.6 ± 6.9 | 0.3 |
| Gender (M/F) | 4/6 | 3/7 | 0.2 |
| Laterality (single/bilateral) | 5/8 | 4/9 | 0.8 |
| Size (mm) | | | |
| Small (≤2 mm) | 4 | 3 | n.a. |
| Medium (2-4 mm) | 4 | 5 | n.a. |
| Large (>4 mm) | 2 | 2 | n.a. |
| Relapse | 0 | 0 | n.a. |

= not significant; n.a. = not applicable.

TABLE 2

| Lesion size (mm) | Group A (n = 10) | Time | Group B (n = 10) | Time | P value# |
|---|---|---|---|---|---|
| Small (≤2 mm) | 4 | 37.6 ± 11.8 | 3 | 23.7 ± 9.8 | 0.01 |
| Medium (2-4 mm) | 4 | * | 5 | * | n.a. |
| Large (>4 mm) | 2 | ** | 2 | ** | n.a. |

Time = resolution time(days);
n.a. = not applicable;
* intralesional injection or
** incision and curettage were performed after three months of follow-up.

I.4. Conclusions

The composition of the invention under study is capable of effectively treating ocular diseases such as inflammatory lesions of ocular adnexa, dry eyes, eyelid allergy, conjunctivitis, blepharitis, meibonite, dacryoliths, stye, without inducing side effects related to the use thereof (Table 3).

TABLE 3

| Adverse effects | Group A | Group B |
|---|---|---|
| Diarrhoea | 0/10 | 1/10 |
| Constipation | 1/10 | 0/10 |
| Loss of appetite | 1/10 | 2/10 |
| Increased appetite | 2/10 | 1/10 |
| Skin rash | 1/10 | 0/10 |
| Ocular disorders | 4/10 | 3/10 |

(II) Clinical Study on Paediatric Subjects

The purpose of this study is to define the possible beneficial impact of probiotics on paediatric patients suffering from inflammatory lesions of ocular adnexa, ocular diseases such as dry eyes, eyelid allergy, conjunctivitis, blepharitis, meibonite, dacryoliths, stye.

II.1. Composition Under Analysis

Similarly to paragraph I.1.

II.2. Patients and Method

The study was conducted at the "V. Tiberio" Department of Medicine and Health Sciences of the University of Molise, Campobasso (Italy), from February 2019 to February 2020. All patients in paediatric age participating to the study had one or more mass lesions of the eyelid and they received a full ophthalmologic examination, including the size, position and duration of the inflammatory lesion of ocular adnexa prior to recruitment. The inclusion criteria were:
  i) history of rapid onset of painful inflamed mass which had reached a stationary dimension for more than 2 months;
  ii) the clinical appearance and location of the lesion.

The exclusion criteria were:
  i) infection of the eyelids;
  ii) duration of the lesion<at 1 month;
  iii) non-palpable lesion;
  iv) suspicion of malignancy.

A prospective comparative pilot study was conducted in 26 patients (9 males and 17 females, age ranging from 3-14 years, mean age 8.3 years) randomly divided into two groups.

The first group, Group A: 13 patients (4 males and 9 females) received conservative treatment with eyelid hygiene, hot compression, and dexamethasone/tobramycin ointment (in short, medical treatment) for at least 20 days.

The second group, Group B: besides the aforementioned conservative treatment (medical treatment), 13 patients (5 males and 8 females) received the composition under analysis once daily for 3 months.

The ethical approval was obtained from the Scientific Technical Committee of the "V. Tiberio" Department of Medicine and Health Sciences of the University of Molise, Campobasso, Italy, and written informed consent was obtained from the parents of all children, in accordance with the Declaration of Helsinki.

II.3. Results

All paediatric subjects in the study completed the test. The mean age was matched in the two groups considered (Group A: mean age 7.9 years; Group B: mean age 8.6 years; p=not significant). Both groups had similar baseline characteristics in terms of size, position and duration of the lesion, with the exception of gender; as a matter of fact, greater prevalence was observed in the female group (Table 4). Significant difference was observed in the time required for full resolution of the lesion between the two Groups (Group A: 51.2 12.4 days; Group B: 28.4-10.8 days; p<0.0001, Mann Whitney U test) (Table 4). No relapse of inflammatory lesions in both Groups was recorded during the follow-up period. The treatment did not induce significant complications in both Groups (Table 5).

TABLE 4

| Characteristics | Group A (n = 13) | Group B (n = 13) | P value |
| --- | --- | --- | --- |
| Mean age (years) | 7.9 ± 1.2 | 8.6 ± 1.9 | 0.3 |
| Gender (M/F) | 4/9 | 5/8 | 0.2 |
| Laterality (single/bilateral) | 5/8 | 4/9 | 0.8 |
| Mean size of the lesion (mm) | 1.9 ± 0.3 | 1.7 ± 0.4 | 0.9 |
| Resolution time (days) | 51.2 ± 12.4 | 28.4 ± 10.8 | 0.0001* |
| Relapse | 0 | 0 | = |

*= statistically significant

TABLE 5

| Adverse effects | Group A | Group B |
| --- | --- | --- |
| Diarrhoea | 0/13 | 1/13 |
| Constipation | 1/13 | 0/13 |
| Loss of appetite | 2/13 | 1/13 |
| Increased appetite | 0/13 | 2/13 |
| Skin rash | 1/13 | 0/13 |
| Ocular disorders | 3/13 | 2/13 |

II.4. Conclusions

The reported study demonstrates the efficacy of probiotics in the treatment of ocular diseases such as dry eyes, eyelid allergy, conjunctivitis, blepharitis, meibonite, dacryoliths, stye, inflammatory lesions of ocular adnexa in paediatric subjects. In particular, the results show that the composition under analysis according to the invention reduces the time required for a full resolution of the inflammatory lesion, without inducing significant complications, and that no relapses were observed in the treated paediatric subjects.

BIOLOGICAL DEPOSITS

*Streptococcus thermophilus* ST10 was deposited at the Deutsche Sammlung von Mikroorganismen und Zellkulturen GmbH (DSMZ) as accession number 25246 on Sep. 19, 2011. The address of the DSMZ is: Leibniz Institute, Inhoffenstraße 7B D-38124 Braunschweig Germany. *Lactococcus lactis* LLC02 was deposited at the Deutsche Sammlung von Mikroorganismen und Zellkulturen GmbH (DSMZ) as accession number 29536 on Oct. 22, 2014. The address of the DSMZ is: Leibniz Institute, Inhoffenstraße 7B D-38124 Braunschweig Germany. *Lactobacillus delbruecki* subsp. *bulgaricus* LDB 01 was deposited at the Deutsche Sammlung von Mikroorganismen und Zellkulturen GmbH (DSMZ) as accession number 16606 on Jul. 20, 2004. The address of the DSMZ is: Leibniz Institute, Inhoffenstraße 7B D-38124 Braunschweig Germany.

The invention claimed is:

1. A mixture M comprising or, alternatively, consisting of:
    a bacterial strain belonging to the species *Streptococcus thermophilus*, identified as *Streptococcus thermophilus* ST10 and deposited at Deutsche Sammlung von Mikroorganismen und Zellkulturen GmbH (DSMZ) under accession number DSM 25246;
    a strain belonging to the species *Lactococcus lactis*, identified as *Lactococcus lactis* LLC02 and deposited at Deutsche Sammlung von Mikroorganismen und Zellkulturen GmbH (DSMZ) under accession number DSM 29536; and
    a strain belonging to the species *Lactobacillus delbruecki* subsp. *bulgaricus*, identified as *Lactobacillus delbruecki* subsp. *bulgaricus* LDB 01 and deposited at Deutsche Sammlung von Mikroorganismen und Zellkulturen GmbH (DSMZ) under accession number DSM 16606.

2. The mixture according to claim 1, wherein said bacterial strains are viable or are derivatives thereof, wherein said derivatives are selected from: tyndallized or sonicated bacterial strains, lysates or homogenates of bacterial strains.

3. A composition comprising
    the mixture M according to claim 1, and
    at least one food or pharmacological grade additive and/or excipient.

4. The mixture or the composition for use according to claim 3, wherein the mixture or composition is formulated for oral use in solid form or liquid form, or formulated for ophthalmic topical use in liquid or semi-liquid form.

5. A method of treating a subject for an eye disorder, comprising administering a composition comprising a mixture of:
    a bacterial strain belonging to the species *Streptococcus thermophilus*, identified as *Streptococcus thermophilus* ST10 and deposited at Deutsche Sammlung von Mikroorganismen und Zellkulturen GmbH (DSMZ) under accession number DSM 25246;
    a strain belonging to the species *Lactococcus lactis*, identified as *Lactococcus lactis* LLC02 and deposited at Deutsche Sammlung von Mikroorganismen und Zellkulturen GmbH (DSMZ) under accession number DSM 29536; and
    a strain belonging to the species *Lactobacillus delbruecki* subsp. *bulgaricus*, identified as *Lactobacillus delbruecki* subsp. *bulgaricus* LDB 01 and deposited at Deutsche Sammlung von Mikroorganismen und Zellkulturen GmbH (DSMZ) under accession number DSM 16606
    to the subject.

6. The method according to claim 5, wherein said bacterial strains are viable or are derivatives thereof, wherein said derivatives are selected from: tyndallized or sonicated bacterial strains, lysates or homogenates of bacterial strains.

7. The method according to claim 6, wherein said eye disorder is a stye, meibomite, blepharitis, dacryoliths, dry eyes, eyelid allergy, conjunctivitis, inflammatory lesions of the ocular adnexa.

8. The method according to claim 5, wherein the composition is administered orally.

9. The method according to claim 5, wherein the composition is administered directly to the eye.

10. The method of claim 9, wherein the composition is administered in combination with an ophthalmic antibiotic and/or an ophthalmic steroidal anti-inflammatory.

11. The method according to claim 10 wherein the ophthalmic antibiotic and/or an ophthalmic steroidal anti-inflammatory are tobramycin and/or dexamethasone.

12. The method of according to claim 5, wherein said subjects are adult subjects or paediatric subjects.

13. The mixture or the composition according to claim 4, wherein the mixture or the composition is formulated for oral use as a tablet, chewable tablet, mouth-dissolving tablet, capsule, granule, flake, or powder, or soluble powder.

14. The mixture or the composition according to claim 4, wherein the mixture or the composition is formulated for ophthalmic topical use as a gel or cream.

* * * * *